(12) United States Patent
Troutman et al.

(10) Patent No.: US 6,970,993 B2
(45) Date of Patent: Nov. 29, 2005

(54) ARCHITECTURE TO RELAX MEMORY PERFORMANCE REQUIREMENTS

(75) Inventors: Bruce L. Troutman, Meridian, ID (US); Russell B. Lloyd, Middleton, ID (US); Randal Q. Thornley, Nampa, ID (US)

(73) Assignee: ZiLOG, Inc., San Jose, CA (US)

( * ) Notice: Subject to any disclaimer, the term of this patent is extended or adjusted under 35 U.S.C. 154(b) by 0 days.

(21) Appl. No.: 10/658,058

(22) Filed: Sep. 8, 2003

(65) Prior Publication Data

US 2004/0049652 A1    Mar. 11, 2004

Related U.S. Application Data

(62) Division of application No. 09/845,466, filed on Apr. 30, 2001, now Pat. No. 6,643,760.

(51) Int. Cl.[7] .............................................. G06F 12/00
(52) U.S. Cl. ....................... 711/212; 711/219; 711/102; 712/205; 712/210
(58) Field of Search ...................... 711/201, 202, 212, 711/219, 102, 103; 712/210, 205

(56) References Cited

U.S. PATENT DOCUMENTS

| | | | | |
|---|---|---|---|---|
| 4,325,118 A | * | 4/1982 | DeVita et al. | 712/210 |
| 5,535,417 A | * | 7/1996 | Baji et al. | 710/22 |
| 5,559,990 A |  | 9/1996 | Cheng et al. | |
| 5,659,695 A |  | 8/1997 | Kelley et al. | 711/5 |
| 5,765,212 A | * | 6/1998 | Yamada | 711/213 |
| 5,809,306 A | * | 9/1998 | Suzuki et al. | 717/143 |
| 5,880,981 A | * | 3/1999 | Kojima et al. | 708/523 |
| 6,085,280 A |  | 7/2000 | Zink | 711/5 |
| 6,101,595 A | * | 8/2000 | Pickett et al. | 712/205 |
| 6,314,504 B1 |  | 11/2001 | Dent | 711/212 |

FOREIGN PATENT DOCUMENTS

| | | |
|---|---|---|
| EP | 1 050 818 | 11/2000 |
| JP | 62112292 | 5/1987 |
| JP | 02018638 | 1/1990 |

OTHER PUBLICATIONS

International Search Report dated Feb. 19, 2003.

* cited by examiner

Primary Examiner—B. James Peikari
Assistant Examiner—Woo H. Choi
(74) Attorney, Agent, or Firm—Parsons Hsue & De Runtz LLP

(57) ABSTRACT

The present invention provides a memory architecture allowing for instructions of variable length to be stored without wasted memory spaces. Instructions of one, two, and three bytes can all be retrieved in a single fetch. The exemplary embodiment divides the memory block into two x16 memories having some special addressing circuitry. This structure logically arranges the memory into a number of rows, each of four byte-wide columns. To the first of these x16 memories, the full address is provided. If the address is within the two columns of the second x16 memory, the full address is also provided to the second x16 memory. If the address is to the first of the x16 memories, the second x16 memory instead receives the portion of the address specifying the row with one added to it. This results in a dual row access with the last one or two bytes of 3-byte instruction being supplied by the row above the first byte. The net effect is that all the physical memory physical space is used for program code with none being wasted in the 24-bit access.

19 Claims, 3 Drawing Sheets

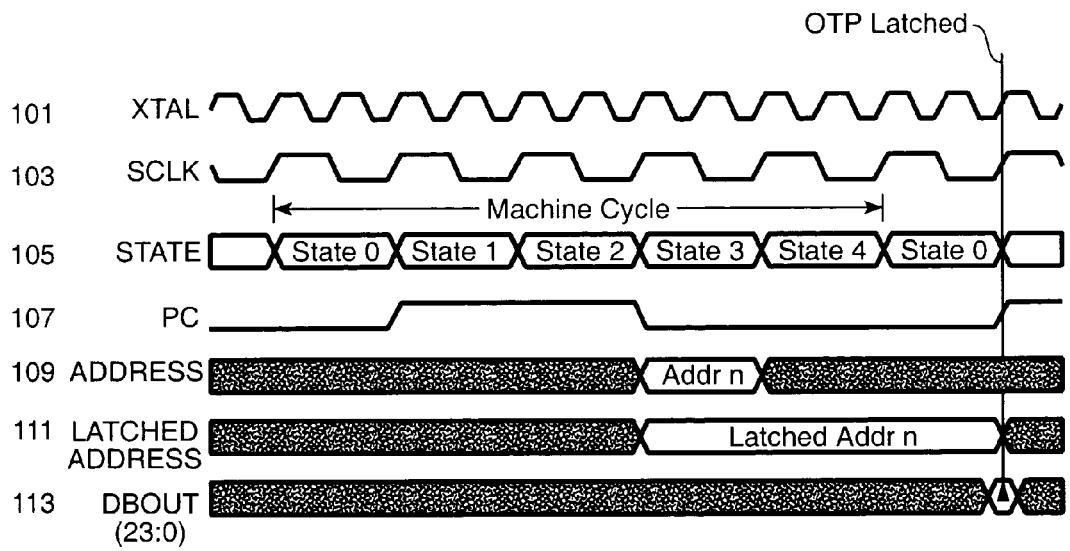
FIG._1
| Logical Address | Memory - Location |
|---|---|
| 0 | OTP 0 - Address 0 |
| 1 | OTP 1 - Address 0 |
| 2 | OTP 2 - Address 0 |
| 3 | OTP 3 - Address 0 |
| 4 | OTP 0 - Address 1 |
| 5 | OTP 1 - Address 1 |
| 6 | OTP 2 - Address 1 |
| Etc. | Etc. |
FIG._2

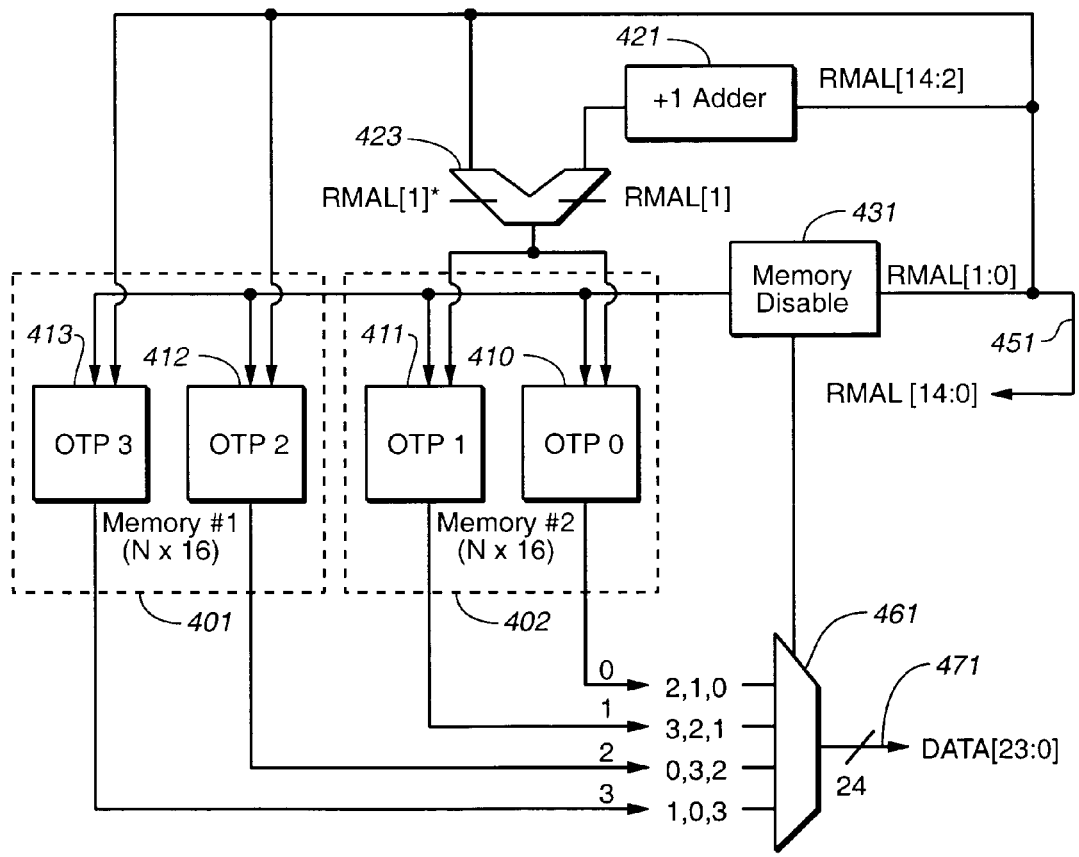
FIG._3
FIG._4

| OTP 3 | | OTP 2 | | OTP 1 | | OTP 0 | | RMAL(4:0) |
|---|---|---|---|---|---|---|---|---|
| Add - +1 | +0 | +1 | +0 | +1 | +0 | +1 | +0 | |
| X | X | | 2 | | 1 | | 0 | 00000 |
| | 3 | | 2 | | 1 | X | X | 00001 |
| | 3 | | 2 | X | X | 4 | | 00010 |
| | 3 | X | X | 5 | | 4 | | 00011 |
| X | X | | 6 | | 5 | | 4 | 00100 |
| | 7 | | 6 | | 5 | X | X | 00101 |
| | 7 | | 6 | X | X | 8 | | 00110 |
| | 7 | X | X | 9 | | 8 | | 00111 |
| X | X | | 10 | | 9 | | 8 | 01000 |
| | 11 | | 10 | | 9 | X | X | 01001 |
| | 11 | | 10 | X | X | 12 | | 01010 |
| | 11 | X | X | 13 | | 12 | | 01011 |
| X | X | | 14 | | 13 | | 12 | 01100 |
| | 15 | | 14 | | 13 | X | X | 01101 |
| | 15 | | 14 | X | X | 16 | | 01110 |
| | 15 | X | X | 17 | | 16 | | 01111 |
| X | X | | 18 | | 17 | | 16 | 10000 |
| | 19 | | 18 | | 17 | X | X | 10001 |
| | 19 | | 18 | X | X | 20 | | 10010 |
| | 19 | X | X | 21 | | 20 | | 10011 |
| X | X | | 22 | | 21 | | 20 | 10100 |
| | 23 | | 22 | | 21 | X | X | 10101 |
| | 23 | | 22 | X | X | 24 | | 10110 |
| | 23 | X | X | 25 | | 24 | | 10111 |
| X | X | | 26 | | 25 | | 24 | 11000 |
| | 27 | | 26 | | 25 | X | X | 11001 |
| | 27 | | 26 | X | X | 28 | | 11010 |
| | 27 | X | X | 29 | | 28 | | 11011 |
| X | X | | 30 | | 29 | | 28 | 11100 |
| | 31 | | 30 | | 29 | X | X | 11101 |
| | 31 | | 30 | X | X | 32 | | 11110 |
| | 31 | X | X | 33 | | 32 | | 11111 | where X is a "don't care" state

*FIG._5*

ARCHITECTURE TO RELAX MEMORY PERFORMANCE REQUIREMENTS

CROSS-REFERENCE TO RELATED APPLICATIONS

This is a division of application serial No. 09/845,466, filed Apr. 30, 2001, U.S. Pat. No. 6,643,760 which application is incorporated herein in its entirety by this reference.

BACKGROUND OF THE INVENTION

1. Field of the Invention

This invention relates generally to memory structure, and, more specifically, to architectures for storing and retrieving multi-byte instructions.

2. Background Information

In a microprocessor, instructions and other data are transferred between the memory and the CPU along a data bus of a size fixed by the microprocessor's architecture. The amount of data that can be supplied in a single fetch operation is determined by this bus size. The microprocessor will also have addressing circuitry, usually employing a separate bus, for designating the location of the data to be fetched.

One example of a memory often found on a microprocessor is the one time programmable (OTP) memory. This is usually a relatively small memory such as, an EPROM, in which the instructions for the microprocessor's particular application are programmed. Although most of this discussion is more general, many of the described problems are more acute in the OTP example due the limited size of this memory and the frequency with which it is used.

As the complexity of tasks to which microprocessors are applied has increased, the number of instructions needed have correspondingly increased. This number of instructions frequently cannot be accommodated within the available number of instruction that can be constructed out of one or two bytes. Consequently, it has become increasingly common for the instruction set to include three byte instructions. As the standard data bus for supplying these instructions is usually one or two bytes wide, the processor must perform multiple fetches to retrieve a three-byte instruction.

This subjects the memory to some very stringent access requirements. For example, consider the case of a microprocessor that supports single, double, and triple byte instructions with an internal bus width of the memory data word is 16 bits. If the instruction set had just included single or double byte instructions, then a single 16-bit memory access could provide the code word, whether single or double byte, for program executions. This access could just occur once per machine cycle time and not be a strain on the memory circuitry or process technology. However, if three byte instructions are an integral part of the architecture, it is necessary for the user to perform two 16-bit memory accesses per machine cycle in order to retrieve a three-byte instruction. Consequently, the required memory access speed will be at least halved relative case when only one and two byte instructions are required.

This problem is further aggravated when the machine uses instructions that vary in length between one and three bytes. This produces the problem of how to retrieve the correct number of bits and not waste memory space. For example, with a three-byte instruction in an architecture with a 16-bit bus, two 16-bit memory fetches would provide 32 bits of data when only 24 bits are needed for the instruction. The additional eight bits in memory would be wasted since the next 16-bit access could not begin on an eight bit word boundary.

SUMMARY OF THE INVENTION

The present invention could be expanded to applications for any number of bytes, but for ease of illustration the invention will be based upon performing a single 24-bit memory fetch, which allows the user to access all three bytes of a maximum length instruction simultaneously. This access needs only to occur once per machine cycle, thereby relaxing of the memory requirements. This access relaxation makes it easier to design the memory, will allow a lower power design, prolongs the usability of the process technology, or enable us to increase the physical memory size while maintaining performance. The present invention also incorporates instructions that are a single or double byte wide without any degradation in performance or wasted physical memory space. For single byte instructions, the primary byte is accessed along with the next two bytes in the address sequence. The processor knows up-front that a single-byte instruction is being accessed and ignores the two other bytes that are presented. A two-byte instruction fetch is performed in a similar way, with 24 bits with the first two bytes (16 bits) being the instruction and the remaining single byte being the next instruction in the address sequence. The processor knows it is accessing a two-byte instruction and accepts the data while disregarding the remaining byte of the three-byte access.

To achieve this operation, the exemplary embodiment divides the memory block into two ×16 memories with the second memory having some special addressing circuitry. This structure logically arranges the memory into a number of rows, each of four byte-wide columns. To the first of these ×16 memories, the full address is provided. If the address is within the two columns of the second ×16 memory, the full address is also provided to the second ×16 memory. If the address is to the first of the ×16 memories, the second ×16 memory instead receives the portion of the address specifying the row with one added to it. This results in a dual row access with the last one or two bytes of 3-byte instruction being supplied by the row above the first byte. The net effect is that all the physical memory physical space is used for program code with none being wasted in the 24-bit access.

Additional aspects, features and advantages of the present invention are included in the following description of specific representative embodiments, which description should be taken in conjunction with the accompanying drawings.

BRIEF DESCRIPTION OF THE DRAWINGS

FIG. 1 is the timing diagram of an exemplary embodiment.

FIG. 2 illustrates the relation between logical address and memory location.

FIG. 3 is a visual bitmap illustrating the memory storage.

FIG. 4 is a block diagram of the exemplary embodiment of the memory implementation.

FIG. 5 is a table illustrating the relation of the RMAL address to memory location.

DESCRIPTION OF REPRESENTATIVE EMBODIMENTS

Consider a processor architecture that supports single, double, and triple byte instructions whose internal bus width of the memory data word is 16 bits. If the instruction set had just included single or double byte instructions, then a single 16-bit memory access could provide the code word, wither single or double byte, for program executions. This access could just occur once per machine cycle time and not be a strain on the memory circuitry or process technology. However, when three byte instructions are an integral part of the architecture, it is necessary for the user to perform two 16-bit memory accesses per machine cycle in order to retrieve a three-byte instruction. This subjects the memory to some very stringent access requirements.

In an exemplary processor embodiment, the invention is based upon performing a single 24-bit memory fetch, which allows the user to access all three bytes of the maximum length instruction simultaneously. This access needs only to occur once per machine cycle, which provides a relaxation of the memory access time by at least a factor of two. This access relaxation makes it easier to design the memory, will ultimately allow a lower power design, prolongs the usability of the process technology, or could enable us to increase the physical memory size by a factor of two or more while maintaining present performance.

Although this access approach addresses a three-byte instruction, however, the majority of instructions are generally just a single or double byte wide. In the exemplary embodiment, the present invention encompasses those predominant requirements without any degradation performance or wasted physical memory space. As noted earlier, a single 24-bit access is performed every machine cycle. For single byte instructions, the primary byte is accessed along with the next two bytes in the address sequence. The processor knows up-front that a single-byte instruction is being accessed and consequently ignores the two other bytes that are presented. A two-byte instruction fetch is performed in a similar way. Again, 24 bits are accessed, with the first two bytes (16 bits) being the instruction and the remaining single byte being the next instruction in the address sequence. The processor again knows it is accessing a two-byte instruction and accepts the data while disregarding the remaining byte of the three-byte access.

In order to achieve this type of efficient operation, the memory block is divided up into two ×16 memories with the second memory having some special addressing circuitry. The net effect is that all the physical memory physical space is used for program code with none being wasted in the 24-bit access.

The exemplary embodiment is a One Time Programmable (OTP) memory, that may be embedded in the processor where many of the described problems are more acute due the limited size of this memory and the frequency with which it is used. This memory interface of the present invention significantly reduces the OTP performance requirements for design/process technologies in OTP or other memory structures. Even though integrated circuit feature sizes are continuing to decrease, the drive capability of OTP cell has often not tracked at the same rate due the introduction of instructions requiring more than one fetch. So, it becomes necessary that memory performance be enhanced by circuit and architectural techniques. This approach can provide an effective longer life for OTP technology as well as offering additional benefits: (1) potential of lower memory power, (2) smaller silicon area, (3) lower voltage operation, (4) and the ability to add additional memory to an existing product line while maintaining customer performance expectations.

Consider a case in which the entire instruction could be read out of memory at one time instead of having to resort to multiple byte fetches to create the full three byte instruction. If all the instructions were 3 bytes wide, it would appear that a unified memory with 24-bit access (3 bytes) would be the ideal solution. Since the majority of the instructions are single/double byte wide, this approach quickly falls apart as memory physical boundaries are crossed. The boundary problem could be solved at the expense of wasted memory locations or complex intra-memory decoding schemes.

An alternative approach would be to still follow the 24-bit access theme but to accomplish it with 3 standalone 8-bit wide memories. This would yield smaller physical memories; but the extra overhead for separate decoders, complex address control logic, etc. becomes prohibitive as addresses are generally binary based.

The present approach extends the multi-byte access approach. In the exemplary embodiment, it is implemented with two 16-bit memories with some relatively simple address control logic. This provides the ability to read a full 3-byte instruction at a single memory access and eliminates the need for a second fetch in the machine cycle. Just 24 bits out of the 32 bits are read at a given time with the current single byte word plus the next two being accessed simultaneously. This technique provides complete utilization of the memory with no wasted code space caused by access boundary. Since 8 bits of one of the memories is not read, some easily implemented logic can be used to turn off the circuitry associated with those bits in order to save power.

FIG. 1 shows a timing diagram for the operation of this exemplary embodiment. The external clock pulse is shown as XTAL 101 and, to make the discussion concrete, can be taken here as having a frequency of 20 Mhz, or 50 ns per clock. Below this is the system clock SCLK 103 at half the frequency. Here the basic machine cycle is taken to 5 states, corresponding to 10 XTAL clocks, as shown in STATE 105. The timing diagram of FIG. 1 also uses a "precharge" which is used (via reserved timing slots) to set up the memory while the addresses are changing, shown as PC 107. Alternate designs may or may not use a "precharge" approach; hence, the actual timing and performance enhancements would need to be altered accordingly. The architecture of the exemplary embodiment provides 4XTAL clocks to "precharge" and 6 XTAL clocks to evaluate the memory, as shown in ADDRESS 109 and LATCHED ADDRESS 111, before it is latched into the core at DBOUT(23:0). In this particular example, the memory access time is 10 XTAL clocks, which translates into 500 ns.

To illustrate this architecture, consider four 8-bit memories to simplify the analysis. As a particular embodiment of this memory is as a one time programmable memory, these four memories will be labeled OTP0-OTP3. Subsequently, these 4 memories are organized into a pair of 16-bit memories. Assume that each memory has 4 columns per bit for a total of 32 columns. FIG. 2 illustrates the relation between logical address and memory location how the memory data can be physically stored. FIG. 3 is a visual bitmap to illustrate the storage with the logical address shown below its location in the respective memory.

The information in FIG. 3 represents both the program code and physical (address accessible) location. For example, the darkened location represents the physical memory address location of "1" of OTP3 with the content of that location being the program code corresponding to an overall memory access at location $0007_{hex}$.

The access algorithm consists of reading the primary location out of the memory (defined by the memory address RMAL[14:0]), plus the next two bytes in the address sequence. For example, if the address selected is $0006_{hex}$, this will consist of the locations $0006_{hex}$, $0007_{hex}$, and $0008_{hex}$: Data Word 6 is read from OTP2 at physical location 1, Data Word 7 is read from OTP3 at physical location 1, Data Word 8 is read from OTP0 at physical location 2, and the output from OTP1 is a "don't care". All of these are from Row 0. Another example may help clarify the read operation when the locations span two rows. If the address selected is $000E_{hex}$: Data Word 14 is read from OTP2 at physical location 3, Data Word 15 is read from OTP3 at physical location 3, Data Word 16 is read from OTP0 at physical location 4 in Row 1, and the output from OTP1 is a "don't care".

For those addresses, such as $000E_{hex}$ example above, where the row needed in OTP0 and OTP1 are different than the row needed for OTP2 and OTP3, the needed memory address scrambling may be implemented with a simple adder that adds "1" to RMAL[14:2]. Some of the memories will have the ability to either access the memory cell based on the address given or to use the address with the +1 offset. This can further be simplified since not all of the memory bits needs to be read (i.e., recall that just 24 out of the 32 bits are needed).

FIG. 4 is a block diagram of the exemplary embodiment of the memory implementation. This schematic is described with the logic shown for the four 8-bit memories combined into two 16-bit structures. In this example, the size of the memory address, RMAL[14:03], runs from 14 to 0 just because of the size of the memory used in this example. The address size could be any number of bits, although at least three bits are needed in this embodiment to display the full structure allowing the lower two bits to select the correct block.

The combined 16K×32 memory is divided into Memory #1 401 and Memory #2 402, which are respectively subdivided again into the pair OTP3 413 and OTP2 412 and the pair OTP1 411 and OTP0 410. The full logical memory address RMAL[14:0] is received along the address bus 451 and is supplied directly to both OTP3 413 and OTP2 412. The full address is also supplied directly to the multiplex unit 423. The partial address RMAL[14:2], that specifies the row, with the two least significant removed, that specify the column, is sent to adder 421, where it is increased by 1 and passed on to the multiplex unit 423.

Consequently, the multiplex unit 423 receives both RMAL[14:0]and RMAL[14:2] increased by 1. If RMAL[1]*=1, that is RMAL[1]=0, RMAL[14:0] is supplied to OTP1 411 and OTP0410. This is the case when logical address is a memory location stored in either OTP1 411 or OTP0 410. When RMAL[1]=1, corresponding to a logical address stored in either OTP3 413 or OTP2 412, RMAL[14:2] increased by 1 is supplied to Memory #2 402 and the row from which OTP1 411 and OTP0 410 are read is shifted up by one. As this arrangement allows the data to be retrieved from two separate rows, where the row being accessed in OTP1 411 or OTP0 410 determined by RMAL[1], this arrangement can be referred to as "Dual Row Access (DRA)".

Since only three of the blocks OTP3-OTP0 414-410 are needed to supply the three bytes comprising the maximum length instruction, one of these blocks will not be need and the corresponding circuitry may be turned off to conserve power. This is done by the block Memory Disable 431 that is coupled to the four memories. Since the unneeded memory is determined by the lowest two bits of the memory address, it receives RMAL[1:0].

Also shown on FIG. 4 is the 3-byte data bus DATA[23:0] 471 and the data output shown from the bottom of each of OTP3-OTP0 413-410. If Memory Disable 431 is included, one of these memory blocks will be turned off and only 3-bytes are supplied for the data bus 471. The processor's core may be constructed to know which byte is the high order byte on the bus. For example, in the case of an embedded OTP memory, the processor may only keep track of the upper and lower bytes in the instruction. Alternately, the memory outputs can be connected to the bus through a multiplex unit 461 to perform a final decoding. The multiplex unit 461 is shown connected to the Memory Disable 431 as the two lower bits of the address, RMAL[1:0], are sufficient to determine to which OTP the high order byte belongs.

The table of FIG. 5 shows a matrix of the RMAL address, whether or not +1 or +0 is added to RMAL[14:2], whether or not the memory can be disabled during this access, and the Data Word read. Only the lowest five bits of a memory address, RMAL[4:0], are shown. The address less its lowest pair of bits determine the row/column of the memory to which the address belongs. The second bit, RMAL[1], determines whether +1 or +0 is added to the address for the OPT1 and OPT0. This is shown in the Add row of FIG. 5, where when RMAL[1]=1, the +1 column is used for OPT1 and OPT0; otherwise, the +0 column is used. The +0 column is always used in this arrangement for OTP3 and OTP2. Finally, lowest two bits, RMAL[1:0], determine which OTP can be turned off. This is shown by the Xs in the columns corresponding to (RMAL[1:0]−1)(mod 4).

This can be shown by revisiting the earlier example (highlighted in FIG. 5) when the RMAL address is $000E_{hex}$ (=01110). RMAL[1]=1, so the addresses to OTP3 and OTP2 get "0" added to them; whereas, the address to OTP0 has "1" added to it. Since RMAL[1:0]=2, OTP1 is not accessed. The resultant is that: OTP2 reads Data Word 14, OTP3 reads Data Word 15, OTP0 jumps to the next row to read Data Word 16, and OTP1 is in a "don't care" state and can be turned off to conserve power.

Note that this arrangement allows the instructions, whether of 3-, 2-, or 1 -byte width, to be stored without wasting any of the memory space. Although the addressing is still based on the standard binary form, 3-byte instructions may be stored in three contiguous locations. This can be particularly important in applications where the available memory space is limited, such as the exemplary OTP embodiment.

Thus, as already noted, in FIG. 5 just RMAL[4:0] of RMAL[14:0] is shown: [4:2] selects the row of the physical location; [1:0] shows which OTP can be turned off, as shown by the "XX"; and [1] shows whether to add 1 to OTP1 and OTP0, as shown by whether the +1 or +0 column is used in these. Taking advantage of the "don't care" states in the control to add either "0" or "1" to the memory addresses allows OTP3 and OTP2 to be grouped together into the single unified sub-memory, Memory#1. Similarly, OTP1 and OTP0 can be combined.

The present invention can be used to expand a processor design based upon a 16 bit data bus with relatively minor modifications to the core to support this new interface. Starting from a architecture where the data path between the OTP and core is currently 16 bits wide, a 24-bit fetch would require: (1) the addition of 8 bits to the 16-bit bus width, (2) the ability to interpret the bytes in the proper order, and (3) the logic to have bytes loaded directly into the op-code latches. If the timing of FIG. 1 is used, the OTP address would need to be made available during State 3. The OTP could latch that address information to make it constantly available to the memory for States 3,4,0. The OTP data would be evaluated during that time period and be available for loading into the op-code latches at the end of State 0.

As only a single memory fetch is used for a 3-byte instruction is this architecture, the demands placed on the memory are greatly reduced. For example, in a arrangement such as in FIG. 1, this will allow a 5× relaxation in the memory access times compared to an implementation needing two fetches. This relaxation can be used to prolong the usable life of an existing technology or utilized by modifying the memory designs to either use lower power, smaller silicon area, lower voltage operation, or adding more memory while maintaining current performance. Alternately, or it can be used to increase device speed independently of clock rate. Again referring to FIG. 1, the use of a single, 24-bit instruction fetch frees up a time slot. Consequently, the device could be reduced from a 5-state operation to 4 states, improving instruction execution times by 20%.

The described structure generalizes in a number of ways. As already mentioned, its use in an OTP memory is just an exemplary embodiment. The described methods and structure can be used with any memory to supply data along a three byte wide bus. Additionally, the choice of the width of 3-bytes is only one example.

In a more general embodiment, the memory can consist of 2N subdivisions of the memory, each K bits wide, with a data bus (N+1)×K bits wide. In the exemplary embodiment, N=2 so that the 2N subdivisions are OTP3-OTP0, and K=8, so that the data bus is three bytes wide. As address structures are generally binary based, the structure of FIG. 4 is most readily implemented when N=$2^n$. In any of these cases, the instructions or other data can be stored contiguously so that no memory space is wasted, even though the width of the bus and the number of columns in the memory are relatively prime, and still supply an instruction the full width of the bus in a single fetch. To use supply M byte wide instructions, where M is still between N and 2N but not equal (N+1), would require the division of the memory into more than two sub-memories and additional multiplex circuits such as 423 of FIG. 4.

For example, consider the case of 5-byte instructions. The memory would then consist of eight memory columns, or OTP7-OTP0, which are split into Memory #1 of OTP7-OTP4 and Memory #2 of OTP3-OTP0. Which of these memories a byte lives in is determined by RMAL[2], which is consequently supplied to the multiplex circuit corresponding to 423 of FIG. 4. The full address is again supplied to Memory #1. When RMAL[2]*=1, the multiplex supplies the full address to Memory #2. As the row is specified by RMAL[R:3], where R is the number of rows, when RMAL[2]=1, RMAL[R:3] plus one is supplied to Memory #2.

Although the various aspects of the present invention have been described with respect to specific exemplary embodiments, it will be understood that the invention is entitled to protection within the full scope of the appended claims.

What is claimed is:

1. A microprocessor, comprising:
    a central processing unit with an instruction set including three-byte instructions, two-byte instructions and one-byte instructions;
    a memory for storing the instructions, wherein all of a selected set of the instructions is stored contiguously without any gaps; and
    a memory interface for supplying the instructions from the memory to the central processing unit, wherein all bytes of each of said selected instructions are supplied simultaneously in a single fetch operation.

2. The microprocessor of claim 1, wherein said memory is four bytes wide.

3. The microprocessor of claim 1, wherein said memory is a one time programmable memory.

4. A method of operating a microprocessor, the microprocessor comprising a central processing unit with an instruction set including N-byte instructions, a memory for storing the instructions, and a memory interface for supplying the instructions from the memory to the central processing unit, wherein N is an integer greater than one, the method comprising:
    logically organizing the memory as a plurality rows of M byte-wide columns, wherein M is an integer greater than one and wherein N and M are relatively prime;
    programming a selected set of instructions of the instruction set into the memory, wherein all of the selected set of instructions is stored contiguously without any gaps in the memory; and
    operating the interface whereby each of the selected instructions can be supplied simultaneously from the memory to the central processing unit in a single fetch operation.

5. The method of claim 4, wherein N is equal to three and M is equal to four.

6. The method of claim 5, wherein said instruction set further includes two byte instructions and one byte instructions.

7. The method of claim 6, wherein said memory interface comprises a bus on which the selected instructions are supplied from said memory to the central processing unit and wherein said bus is three bytes wide.

8. The method of claim 6, wherein the memory is an embedded memory of the microprocessor.

9. The method of claim 8, wherein the memory is a one time programmable memory.

10. The method of claim 5, wherein said memory interface comprises a bus on which the selected instructions are supplied from said memory to the central processing unit and wherein said bus is three bytes wide.

11. The method of claim 4, wherein the memory is an embedded memory of the microprocessor.

12. The method of claim 11, wherein the memory is a one time programmable memory.

13. A microprocessor, comprising:
    a central processing unit with an instruction set including three-byte instructions, two-byte instructions and one-byte instructions;
    a memory for storing the instructions, wherein the instructions are stored contiguously; and
    a memory interface for supplying the instructions from the memory to the central processing unit, wherein all bytes of each of said instructions are supplied simultaneously in a single fetch operation, and wherein said memory interface comprises a bus on which the instructions are supplied from said memory to the central processing unit and wherein said bus is three bytes wide.

14. The microprocessor of claim 13, wherein the memory is an embedded memory of the microprocessor.

15. The microprocessor of claim 13, wherein the memory is a one time programmable memory.

16. A microprocessor, comprising:
- a central processing unit operable according to an instruction set including instructions of one-byte, two-byte, and three-byte lengths;
- a memory for storing a selected set of said instructions, wherein all of the selected set is stored contiguously without any gaps; and
- a memory interface for supplying instructions of the instruction set from the memory to the central processing unit, wherein each of said instructions is individually suppliable in a single fetch operation in which all bytes of a supplied instruction are supplied simultaneously.

17. The microprocessor of claim 16, wherein said memory is organized as a plurality rows of M byte-wide columns, wherein M is an integer greater than three that is not divisible by three.

18. The microprocessor of claim 16, wherein said memory is a one time programmable memory.

19. The microprocessor of claim 16, wherein said memory interface comprises a bus on which the instructions are supplied from said memory to the central processing unit and wherein said bus is three bytes wide.

* * * * *